May 7, 1957   C. R. JOHNSON ET AL   2,791,318
CONVEYOR FOR HANDLING A SHOCK-SENSITIVE ARTICLE
Filed Sept. 15, 1954   7 Sheets-Sheet 1

INVENTORS
CHARLES R. JOHNSON
EDGAR H. SCHMIDT
BY Carl A. Hechmer
ATTORNEY

INVENTORS
CHARLES R. JOHNSON
EDGAR H. SCHMIDT
BY Carl A. Hechmer
ATTORNEY May 7, 1957 C. R. JOHNSON ET AL 2,791,318
CONVEYOR FOR HANDLING A SHOCK-SENSITIVE ARTICLE
Filed Sept. 15, 1954 7 Sheets-Sheet 5

INVENTORS
CHARLES R. JOHNSON
EDGAR H. SCHMIDT
BY
Carl A. Hechmer
ATTORNEY

May 7, 1957  C. R. JOHNSON ET AL  2,791,318
CONVEYOR FOR HANDLING A SHOCK-SENSITIVE ARTICLE
Filed Sept. 15, 1954  7 Sheets-Sheet 6

INVENTORS
CHARLES R. JOHNSON
EDGAR H. SCHMIDT
BY
Carl A. Hechmer
ATTORNEY

United States Patent Office 2,791,318
Patented May 7, 1957

---

2,791,318

CONVEYOR FOR HANDLING A SHOCK-SENSITIVE ARTICLE

Charles R. Johnson, Glen Mills, Pa., and Edgar H. Schmidt, Wilmington, Del., assignors to E. I. du Pont de Nemours & Company, Wilmington, Del., a corporation of Delaware Application September 15, 1954, Serial No. 456,171

2 Claims. (Cl. 198—203)

This invention relates to a conveyor. More particularly it is concerned with an endless belt-type of mechanism, especially adaptable to the handling of a shock-sensitive article.

The term "shock-sensitive article" as used herein comprises items of a fragile nature which may structurally disintegrate on dropping or the like as well as those which are frictionally ignitible or explosive on impact or compression.

In the manufacture of a shock-sensitive article any mechanical conveyance of the manufactured item, such as from the assembly mechanism to a packaging apparatus, is usually a delicate undertaking. While the matter is a serious one where only the manufactured article may be lost, it is particularly acute where the article may explode or ignite on impact or scatter a friction sensitive substance over the operating equipment. A complicating feature is introduced when the article is both manufactured in simultaneous multiple units and packaged in different multiple units.

It is an object of the present invention to provide a conveyor especially adaptable to the handling of a shock-sensitive article.

Another object is to provide apparatus for the transportation of a cartridge of a friction and/or a shock-sensitive explosive from the assembly mechanism to the packaging apparatus.

Another object is to provide a continuous conveyor having an article receiver which provides a uniform low drop in the delivery of the article from the conveyor to the receiver.

A further object is to provide a process and apparatus for the handling of a shock-sensitive article which will automatically compensate for any difference in the multiplicity of units of bulk of the article as received and delivered by the apparatus.

These and other objects will become apparent in the course of the following specification and claims.

In accordance with the present invention a continuous conveyor for a shock-sensitive article is provided which shields the article from the driving friction generating equipment, delivers the transported article into an article receiver in a "uniform low-drop" manner and which automatically compensates for any difference in the units of bulk of the article as acquired by the conveyor and as delivered to the article receiver. The shielding is obtained by providing a traveling, non-sparking partition between a housed, sprocket-driven continuous chain and a continuous tray connected thereto and projected laterally therefrom, the traveling partition being loosely keyed to the chain housing so as to deflect particles scattered on or above the tray away from the driving, friction-generating equipment. A "uniform low-drop" delivery of the transported article is made possible by virtue of a "single unit accommodating" expanding hopper which integrates the single items for packaging. Compensation for the difference in units of bulk of articles as received upon and delivered by the conveyor is obtained by providing two independent, centrally located sprocket drives for the top and bottom tiers of the continuous chain respectively, the ends of the chain being supported by idler sprockets capable of lateral displacement along the path of chain travel and tensioned to give or remove slack as necessary during operation.

The invention will be more readily understood by reference to the drawings. The conveyor illustrated is adapted to the transporting of sticks of dynamite from a shell-filling machine such as described in United States Patent No. 1,031,644 to H. P. Hall to a box-handling station where the dynamite sticks are loaded for shipment.

Figure 3 is an elevation of a carrying finger of the continuous tray mounted upon its shaft;

Figure 1:
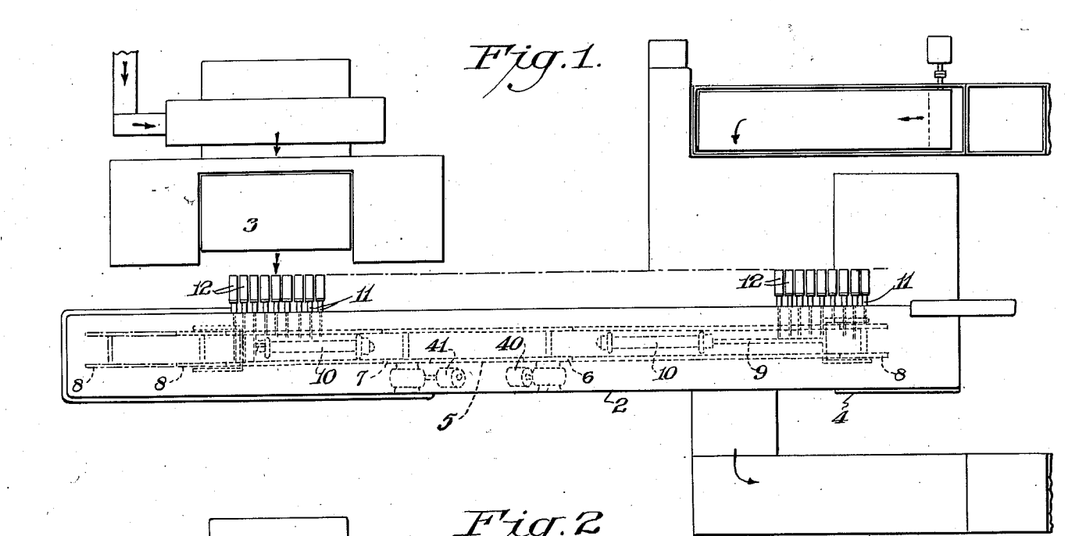
Figure 1 is a plan view of a continuous conveyor of the present invention disposed to receive sticks of dynamite from an assembly unit and to deliver them to a packaging mechanism.

Referring particularly to Figure 1, a conveyor comprising a traveling continuous tray 1, projected laterally from a chain-drive mechanism in a housing 2 is disposed between dynamite assembly machine 3 and a box-handling mechanism 4. The assembled sticks of dynamite are intermittently disposed across the width of the continuous tray in multiple units in parallel array by the ejection mechanism of the dynamite assembly machine. They are transported to the box-handling area where they are removed from the continuous tray by gravity and eventually loaded into boxes. It is usually convenient to raise the manufactured items during the transporting operation so as to permit box handling to be accomplished under the conveyor mechanism and on the same floor level as the assembly mechanism. This is shown in the diagrammatic representation of Figure 2 which shows the arrangement of the supporting chain mechanism 5 within housing 2. The assembled sticks of dynamite are placed on that portion of the continuous tray which is attached to the top tier of the chain drive at the lower end of the conveyor. This is the position opposite the dynamite assembly machine. They are raised in the center section of the conveyor. The upper end of the conveyor is over the box-handling mechanism.

Figure 2:
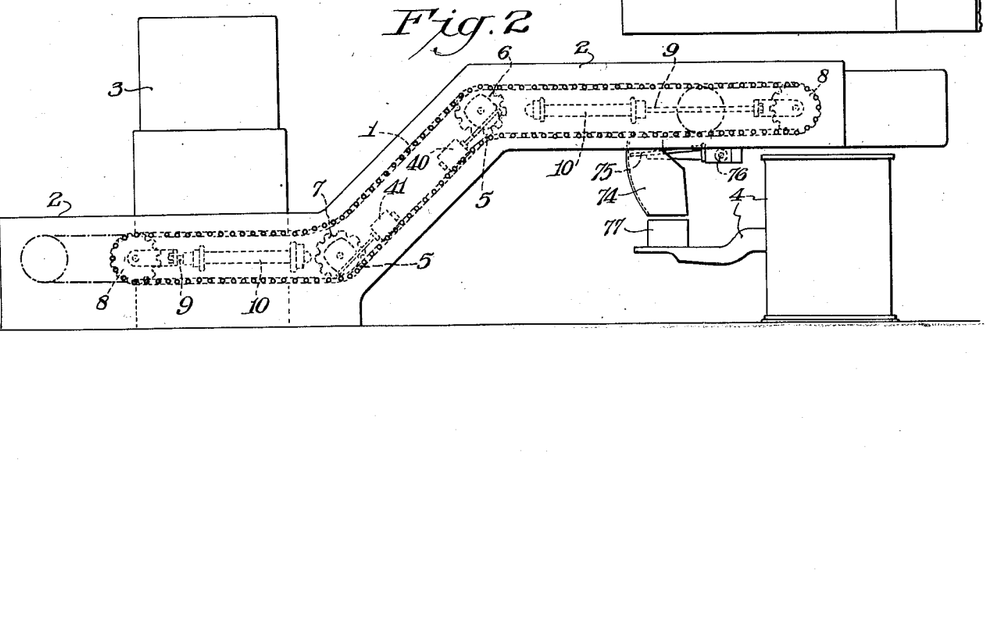
Figure 2 is a schematic elevation illustrating the centrally located sprocket drives and the compensating sprockets.

The top tier of the supporting chain mechanism is tractioned by drive sprocket 6. The motivation of this element is geared to the ejection cycles of the manufacturing mechanism. After the manufactured items have been placed, as previously described, along the top tier of the continuous tray, they are moved, by action of the top tier drive sprocket on the supporting chain, a distance sufficient to permit another similar loading by the manufacturing mechanism. At this point, motion of the top tier of the continuous tray and its supporting chain from which the tray is laterally projected, is halted while another loading is accomplished. Thus, motion of the top tier of the conveyor occurs only between ejection cycles of the manufacturing mechanism and only to that extent necessary to present free surface for the subsequently ejected array of items.

The movement of the bottom tier of the conveyor is accomplished at drive sprocket 7. The motion of this tier, as will be explained hereinafter controls the speed at which the manufactured items are delivered to the collecting hopper 74. Delivery of manufactured items to the hopper must be halted during those periods wherein the hopper is being emptied into shipping container 77. Thus motion of the bottom tier is also intermittent and for periods which are not necessarily the same as the periods of motion for the top tier during any given time interval.

To provide for any difference in motion at the drive sprockets between the bottom and top tier during a particular interval, compensating devices are placed at each end of the supporting chain. Each compensator consists of an idler sprocket 8 capable of horizontal lateral displacement along the horizontal path of the chain travel and tensioned to yield or remove slack as required. As shown, the tensioning is provided hydraulically by tensioning piston 9 in cylinder 10. Thus when the motion of the top tier exceeds that of the bottom tier for any time interval, both idler sprockets move toward the upper or boxing end of the conveyor. On the other hand, when the motion of the bottom tier exceeds that of the top tier for any time interval, both idler sprockets move toward the lower or manufacturing machine end of the conveyor. It will be obvious that for operation over an extended period relative motions of the top and bottom tiers must balance out within the compensating ability of the idler sprockets.

The continuous tray upon which the manufactured item rests during transportation by the conveyor is composed of juxtaposed conveying fingers as shown in the elevation of Figure 3. This element comprises round finger shaft 11 having horizontal tray 12 at its outboard or free end. Vertical partition walls 13 extend normal to the horizontal tray. The partition walls extending above and below the horizontal tray respectively are conveniently of different spacing to permit the finger to accommodate articles of two different sizes, depending upon which surface of the tray is turned upwardly along the top tier. The inboard or attaching end of the finger shaft has a bore 14 along its longitudinal axis to permit mounting. This bore extends through locking block 15 at the inboard terminus of the finger shaft. In mounting the conveying finger, bore 14 is slipped over the mounting arm 22. Retaining pin 23 fastens locking block 15 to the carrying finger shaft 11. Circumferential grooves 17 are provided along the finger shaft to permit secure fitting of overlapping elements of traveling partition 24.

Figures 4, 4A, 5:
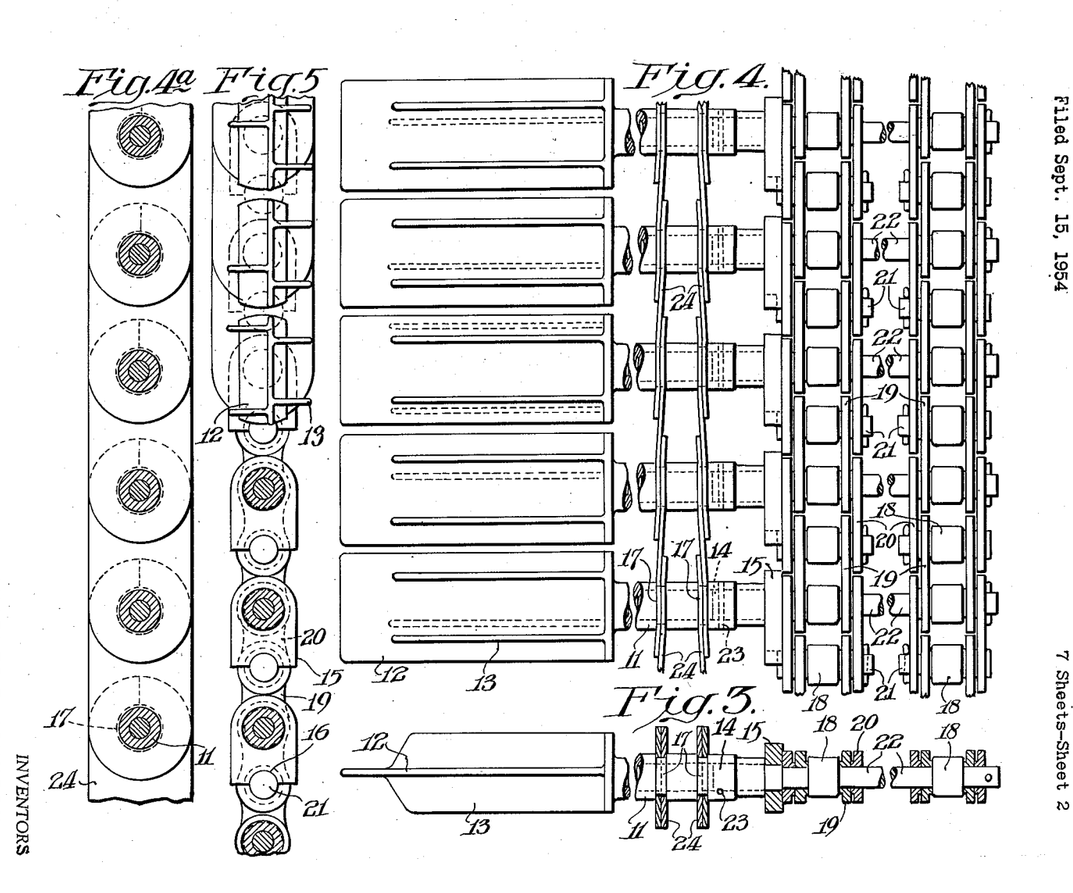
Figure 4 is a fragmentary plan view of the continuous tray illustrating its relation to the continuous chain structures.
Figure 4a is an elevation of a part of the traveling partitions of Figure 4.
Figure 5 is an end view partly in section of the tray structure of Figure 4.

In Figure 4 several conveying fingers are shown mounted. The supporting chain for the continuous tray is provided by a pair of parallelly disposed endless link chains. The chains are of conventional construction comprising journaled spacers 18 supported by parallel link plates 19 to form links, the various links being joined in an endless fashion by parallel side plates 20 mounted on the spacer shaft of adjacent links. The shaft for the spacers is alternately a cottered bolt 21 and a finger mounting arm 22 cottered at its non-extending end. Each cottered bolt passes through the spacer of a single chain. Each mounting arm passes through one spacer of each chain, thus maintaining the two chains in a fixed parallel relation to each other.

The traveling, non-sparking partition 24 is fitted to circumferential grooves 17 on the shafts of the carrying fingers 11 as shown in Figure 4. An elevation of traveling partition 24 is shown in Figure 4a. It is composed of a multiplicity of overlapping flexible plates having at each end a hole which fits over the circumferential grooves 17 in shaft 11. The trailing hole is slit to assist in assembly. To assemble the partition, as is evident from Figure 4, the unslit holes of two partition elements are forced over locking block 15 and along shaft 11 until each engages one of the two circumferential grooves 17. After the carrying finger is in place on finger mounting arm 22, the split holes are fitted around the circumferential grooves of the next adjacent trailing shaft.

An end view partly in section of a portion of the continuous tray illustrating the arrangement of the vertical partitions 13 and also the engaged position of locking block 15 is shown in Figure 5. The outboard section of four carrying fingers is cut away between the traveling partition and the locking block giving an elevation showing the fitting of cut-out 16 in locking block 15 over the head of the adjacent cottered bolt 21. It will be obvious from a consideration of this drawing that the continuous tray can be "turned over" to utilize a different spacing between vertical partition walls 13 by slipping the carrying finger far enough off of its shaft to permit locking block 15 to clear the head of cottered bolt 21, turning the carrying finger 180° on its shaft and sliding it back flush against the outboard endless supporting chain with the cut-out 16 of locking block 15 engaging its oppositely adjacent cottered bolt head.

Figures 6, 20:
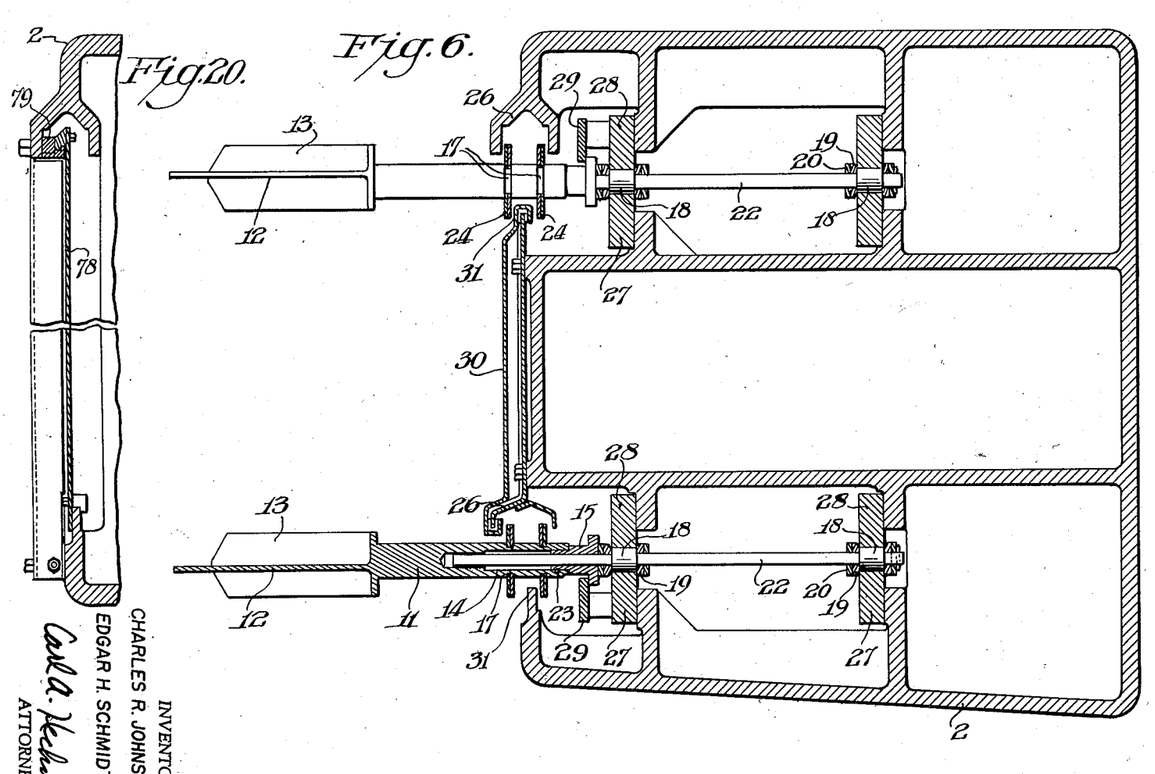
Figure 6 is a typical cross-sectional elevation of the conveyor.
Figure 20 is a sectional elevation along lines 20—20 of Figure 16.

Figure 6 is a sectional elevation showing a typical cross section of the housing and chain drive in the upper loop of the conveyor. The housing 2 is of an E type cross-sectional construction. The supporting chain revolves about the horizontal center bar of the elongated E. The weight of the revolving elements is borne by the center and bottom horizontal arms of the E. The center arm is of a rectangular tube-type construction. Each of the weight-bearing surfaces carries chain support slides 27 along its length. A similar slide serving as a chain guide slide 28 is provided on the non-weight bearing surfaces. The width of the slides is no greater than the length of spacers 18. Such construction restricts lateral motion of the chain drive due to the confining action of link plates 19. A retaining strip 29 parallel and connected to the outboard chain guide slide 28 of the upper chain tier and the outboard chain support slide 27 of the lower chain tier fits over locking block 15 and assists in preventing the conveyor finger from slipping off its supporting arm and disengaging its lock spacer. Such action would permit the conveyor finger to rotate about its carrying arm. A dust seal is provided at the open side of the E housing to protect friction generating surfaces from any shock sensitive material which might spill upon the continuous tray. This seal is formed by encasing the tops of traveling partitions 24 of each tier in a channel 26 and extending a protruding plate 31 into the bottom cleft of the traveling partitions of each tier. The channel for the top tier and the protruding plate for the bottom tier are integral parts of the E frame of housing 2. Center shield plate 30 provides the protruding plate for the upper tier and the channel for the lower tier over that section of the conveyor which lies between the retracted position of each idler sprocket. It is anchored to the center horizontal arm of the E frame of housing 2.

Figures 7, 8, 9:
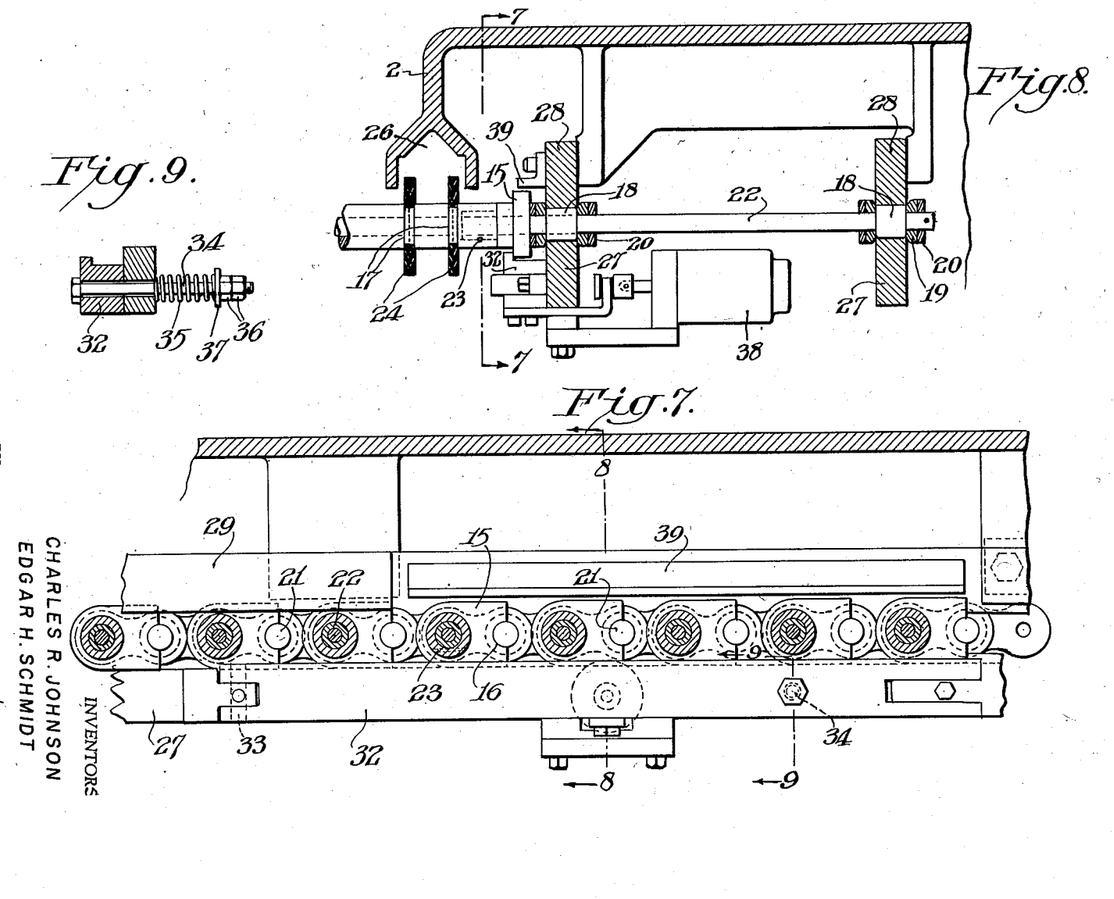
Figure 7 is an elevation partly in section along line 7—7 of Figure 8 of the conveyor at the tray adjustment position.
Figure 8 is a sectional elevation along line 8—8 of Figure 7 illustrating a lock device of the tray adjustment section.
Figure 9 is a sectional elevation at line 9—9 of Figure 7 showing the tensioning device in the tray adjustment section.

To permit the carrying fingers to be turned over, thereby changing the spacings between the vertical partitions 13 along the continuous tray, it is necessary to provide a break in retaining strip 29 as is shown in Figure 7. This is the finger adjustment station. Its location along the frame is conveniently along the top chain tier at the lower end of the conveyor. The fragmentary view is an elevation of locking blocks 15 being shown with the projected portion of the carrying finger removed. Over the section of the retaining strip break, guide strip 39 replaces retaining strip 29. A gate strip 32, hinged at 33 to chain support slide 27, retains the locking blocks 15 in position, preventing their displacement along the length of the finger mounting arm 22. When it is desired to turn over the carrying fingers, gate strip 32 is swung out on its hinge 33. As the conveyor slowly brings each carrying finger within the adjustment station, it is slipped out along the mounting arm 22, far enough to permit cut-out 16 in locking block 15 to clear the head of cottered bolt 21. The finger is then rotated 180° and replaced on the carrying arm with cut-out 16 in engagement with the head of the other adjacent cottered bolt. During normal operation the gate strip is in the closed position as shown and is tensioned at bolt 34. This is shown in cross section at Figure 9, taken along lines 9—9 of Figure 7. Tension is provided by spring 35 which is adjustable by nuts 36 and washer 37. A locking and hydraulic actuating mechanism 38 is provided, attached to chain support slide 27. This is shown in sectional elevation in Figure 8 taken along line 8—8 of Figure 7.

Figure 10:
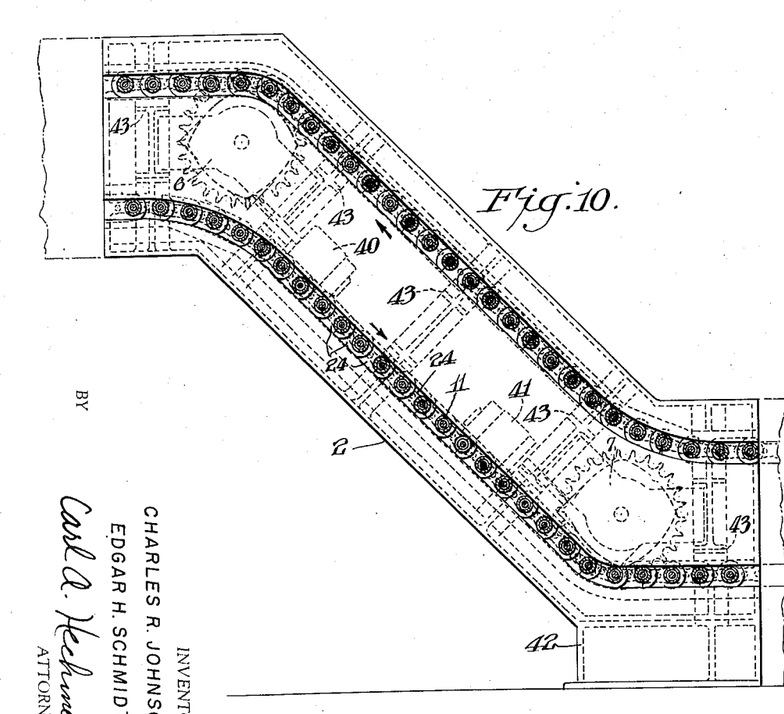
Figure 10 is an elevation partly in section of the center section of the conveyor.
Figure 11:
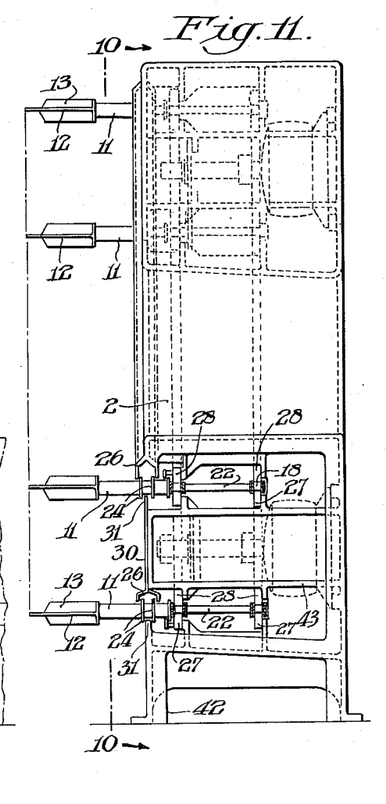
Figure 11 is an end view of the center section of the conveyor as shown in Figure 10.

Figure 10 is an elevation of the center of the conveyor, sectioned across the shafts of the conveying fingers (along lines 10—10 of Figure 11) showing the relative positions of top tier drive sprocket 6 and its motor 40 and the bottom tier drive sprocket 7 and its independently operated motor 41. Housing 2 rests on footing 42 and encloses supporting chain 5 and its mountings. Figure 11 is an end view of Figure 10. The mounting of the finger supporting chain 5 as provided by chain support slides 27 and chain guide slides 28 can be seen. The construction of the dust shield between the traveling tray and the friction generating equipment comprising housing 2, center shield plate 30 and the keying of traveling partition 24 between channels 26 and protruding plates 31 is also shown. The rectangular tubes 43 forming the center bar of the E frame are projected from the continuous side of the frame and are positioned along the frame as shown in Figure 10.

Figures 12, 14:
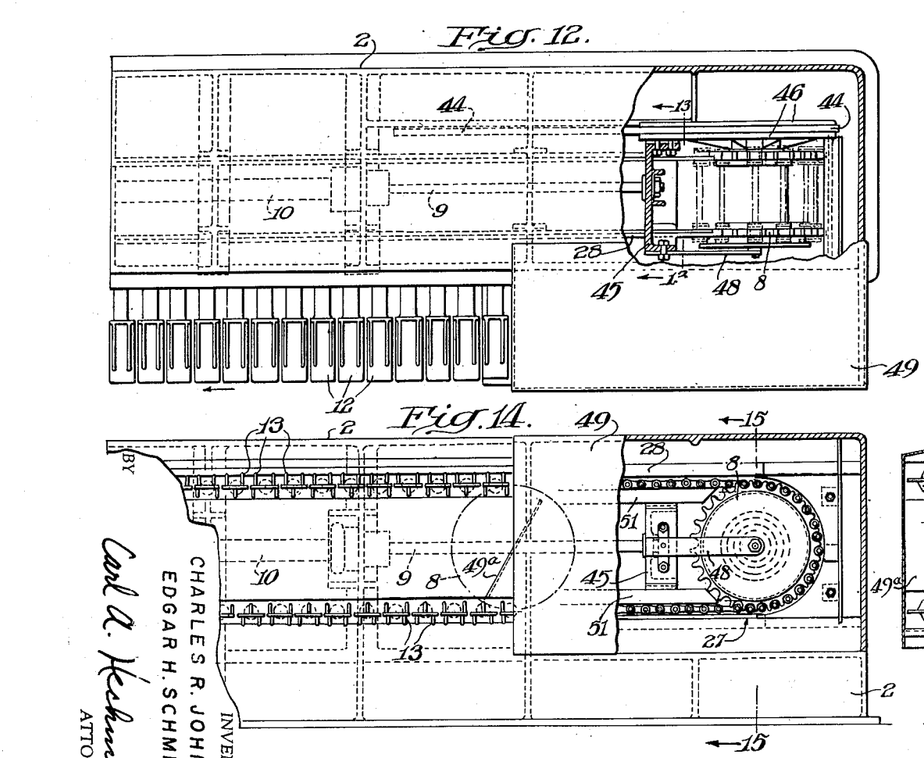
Figure 12 is a top view of the lower end of the conveyor with the stationary tray shield broken away to show the compensating idler sprocket.
Figure 14 is a side view of the lower end of the conveyor with the stationary tray shield broken away to show the compensating idler sprocket.
Figure 13:
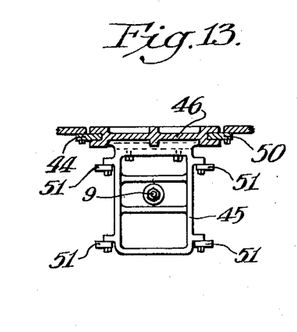
Figure 13 is a sectional elevation across 13—13 of Figure 12.
Figure 15:
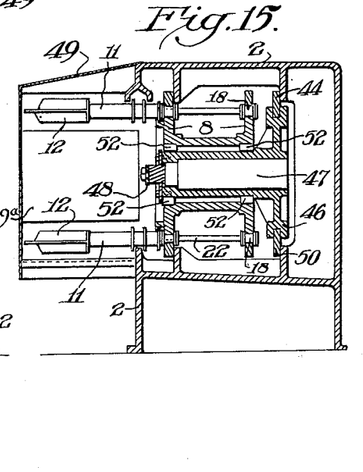
Figure 15 is a sectional elevation across lines 15—15 of Figure 14.

Figures 12 to 15 inclusive are views illustrating the structure of the lower end of the conveyor. Figure 12 is a top view, partly in section. A stationary tray shield 49 extends from housing 2 and serves the double function of protecting operators in that area in which the traveling tray oscillates horizontally during its compensating motion and of keeping foreign materials out of the friction generating area of the machine. A front plate 49a is suspended from tray shield 49 between the bottom and top tiers of the traveling tray. Housing 2 supports within its framework tensioning cylinder 10 which acts by means of piston 9 upon idler sprocket 8 which is mounted on a sliding carriage. The carriage is capable of horizontal lateral displacement along the horizontal path of chain travel by movement along a pair of tracks, one of which, top carriage track 44, can be seen in Figure 12. The carriage assembly, more readily described from Figure 13 (taken along lines 13—13 of Figure 12), consists of a crosshead 45 cantilevered from a sliding plate 46 which in turn is mounted between top carriage track 44 and bottom carriage track 50. A mounting pad at each corner of crosshead 45 serves to anchor a chain slide extension 51. The chain slide extensions move with the crosshead. Those on top of the crosshead support the continuous chain in the top tier as it leaves idler sprocket 8. Those on the bottom of the crosshead serve to guide the continuous chain as it approaches the idler sprocket. The chain slide extensions 51 lie parallel to and slide against chain support slides 27 of the upper tier and chain guide slides 28 of the lower tier. In the section of contact with chain slide extensions 51, chain support slides 27 and chain guide slides 28 are one half of their normal thickness. The combined thickness of these laterally disposed pieces being no greater than the length of journaled spacers. Figure 14 is an elevation partly in section of Figure 12. The side extension of tray shield 49 is broken away to show idler sprocket 8 in its extended position. Chain guide slides 28 for the upper tier and chain support slides 27 for the bottom tier extend beyond the most extended position of idler sprocket 8 without interference with its oscillatory motion. On the other hand the rigid chain support slides for the upper tier and the rigid chain guide slides for the lower tier must terminate beyond the retracted position (shown as a circle in broken line) of the idler sprocket. The chain slide extensions 51 which move with the crosshead bridge the variable gap between the ends of these rigid chain support and guide slides and the idler sprocket. One end of the spindle for the idler sprocket 8 is supported by connecting rod 48 which is cantilevered from crosshead 45. The details of construction of the idler sprocket 8 are more readily apparent from Figure 15 which is a sectional elevation along lines 15—15 of Figure 14. This shows the sprocket spindle 47 which is integral with sliding plate 46. Idler sprocket 8 is mounted through roller bearings 52 upon sprocket spindle 47. The engagement of the sprocket spokes between the spacers of the tray supporting continuous chain serves to guide the conveying fingers of the continuous tray from the bottom tier to the top tier of the conveyor. Immediately after emerging from tray shield 49 the carrying fingers of the top tier of the tray are loaded with the article to be transported to the packaging end of the conveyor.

The oscillation motion of the idler sprocket at the upper end of the conveyor is identical to that of the idler sprocket at the lower end. The structural details are therefore similar in most respects. However, in view of the fact that the article being conveyed must be carried around the idler sprocket at the upper end of the conveyor to be dumped, special guides must be provided and special shielding must be furnished in the area of sprocket oscillation to protect moving parts from accidental contact with friction-sensitive materials.

Figure 16:
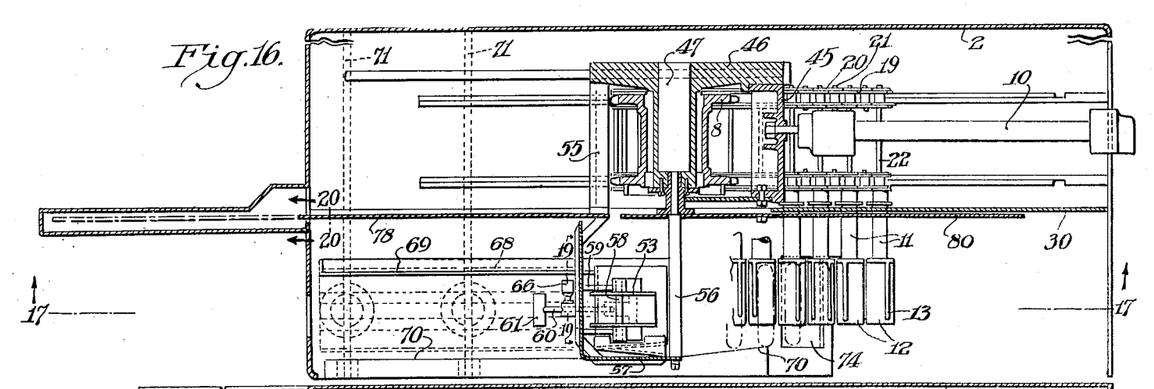
Figure 16 is a plan view partly in section at the upper end of the conveyor.
Figure 17:
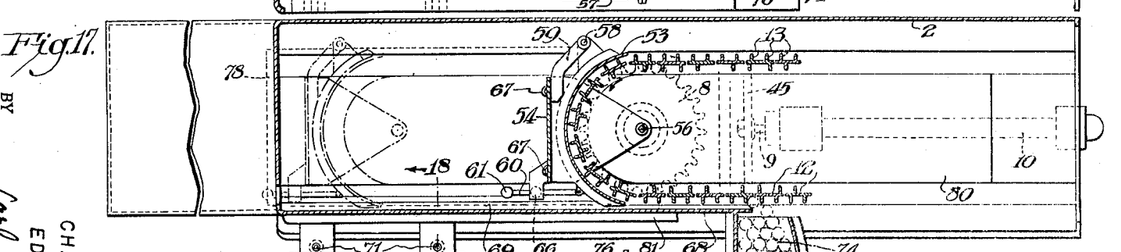
Figure 17 is a sectional elevation on line 17—17 of Figure 16 showing the upper end of the conveyor.
Figure 19:
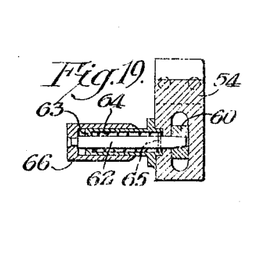
Figure 19 is a sectional elevation along lines 19—19 of Figure 16.

To prevent the continuous tray from dumping the conveyed article as it passes through its turning arc and reverses direction, an adjustable tray guide 53 is provided. Figure 16 shows the structure in a top view. Figure 17 is an elevation taken along lines 17—17 of Figure 16. This guide is a flat curved plate mounted in such fashion that its concave surface encloses the turning arc of the continuous tray and thereby retains any articles being conveyed between vertical partitions 13 of the tray as the carrying fingers pass from the upper to the lower tier. Mounting for tray guide 53 is provided by tray guide support 54 which is part of the carriage assembly. Mounting bar 55 joins one side of support 54 to sliding plate 46. The outer edge of tray guide support 54 is carried on rod extension 56 of sprocket spindle 47 by means of guide support siding 57. Tray guide 53 is suspended from pivoting shaft 58 which in turn is mounted on support arms 59 of tray guide support 54. An adjusting shaft 60 is linked to the lower end of the suspended tray guide 53, passing through an opening in tray guide support 54 and terminating in a handle 61. Adjustment of clearance between the continuous tray and the concave surface of tray guide 53 to provide differences in size of the article being conveyed is made by horizontal displacement adjusting shaft 60 which causes tray guide 53 to pivot around pivoting shaft 58. Tray guide 53 is locked in position by spring loaded dowel 62 which engages holes in adjusting shaft 60. Details of the locking device appear in Figure 19. Dowel 62 is shown engaging a hole of adjusting shaft 60. The device is attached to tray guide support 54 through the dowel spring housing 63. Dowel spring 64 is compressed within the housing and acts upon dowel pin key 65 so as to hold it in its engaged position. Lock handle 66 is integral with dowel 62 and fits over dowel spring housing 63 telescopically. To disengage the lock, lock handle 66 is slipped along spring housing 63 until dowel 62 is free of adjusting shaft 60. Upon release of lock handle 66 dowel spring 64 presses dowel 62 against adjusting shaft 60. Handles 67 upon tray guide support 54 are merely to provide ease in handling this section of the device.

Figure 18:
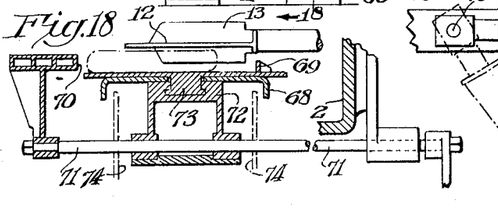
Figure 18 is a sectional elevation along lines 18—18 of Figure 17.

A retaining plate 68 is provided to hold the conveyed articles between vertical partitions 13 of the continuous tray after the carrying fingers have completed their direction reversing arc and have been inverted. This structure and its mounting is shown in Figure 18, taken across lines 18—18 of Figure 17. It presents a smooth surface for movement of the conveyed article toward the article collecting hopper 74 by the motion of the continuous tray. An edge stop 69 comprising a low upright plate running along the inboard edge for the length of retaining plate 68 provides alignment of the conveyed article with the collecting hopper 74. An adjustable cam plate 70 gradually positions the conveyed article against edge stop 69 as the article approaches the collecting point. Each end of cam plate 70 is adjustably mounted on housing 2 by means of table support 71. Retaining plate 68 is mounted upon a table 72 by means of retaining plate key 73 which slides into a slot provided in table 72. A retaining plate support 81 is rigidly fixed to table 72 and strengthens retaining plate 68. Table 72 is adjustably mounted on table support 71.

In the vicinity of the idler sprockets at each end of the conveyor, special moving shields are necessary in view of their horizontal oscillating action. The moving shields at the upper end of the conveyor can be seen in Figure 16. Outer idler shield 78 which moves with the sliding carriage by connection to sliding plate 46 through mounting bar 55 and which fits the cleft between traveling partitions 24 along the outside of their turning arc, provides shielding between the top and bottom horizontal arms of the E frame. It slides upon idler shield tracks 79 shown in Figure 21. Inner idler shield 80 connects to the inboard end of the carriage assembly of the upper section and provides a shield which moves with the sliding carriage and fits the cleft between traveling partitions 24 along the inside of their turning arc. Inner idler shield 80 extends inboard to where it meets and slides against the center shield plate 30 which is supported on rectangular tubes 43 forming the center bar of the E frame. This structure can be seen in Figure 16. Obviously similar sliding shielding can be provided at the lower idler sprocket as well if desired. Adjustment in the height of retaining plate 68 can be made by substitution of retaining plates of various thickness.

Referring again to Figure 17, as the conveyed article reaches the end of retaining plate 68 it drops into a collecting hopper 74. The hopper bottom 75 is pivoted at shaft 76 and is mechanized to expand the hopper capacity sufficiently to permit entry of one additional conveyed article each time an article is fed into it until it is filled. This is accomplished by a microswitch, an electric eye arrangement, a mechanical counting device or the like. Upon filling, the entire load is dropped into a waiting shipping container 77 as shown in Figure 2. During the dumping operation, a switch on hopper bottom 75 cuts off operation of bottom tier drive sprocket 7. After dropping the load, hopper bottom 75 immediately returns to its empty or battery position by virtue of spring loading or the like. Bottom tier drive sprocket 7 is again activated and hopper 74 again begins to collect conveyed articles while a conventional box-handling mechanism removes the filled shipping container.

During the greater period of operation of the device, drive sprocket 6 for the top tier and drive sprocket 7 for the bottom tier move at the same speed. When both bottom tier and top tier are driven at the same speed there is no compensating lateral sliding motion of the carriages at the upper and lower end of the conveyor carrying idler sprockets 8 and none is necessary. However, there are different periods during which motion of either the top tier, the bottom tier or both is interrupted. Thus during those periods in which the hopper empties into the waiting shipping container 77, the motion of the bottom tier is halted. If during this period the top tier continues to move, compensation is provided by lateral motion of the idler sprockets and their carriages, each moving toward the upper end of the conveyor. During such a period, tensioning piston 9 at the upper end of the conveyor extends while the corresponding piston at the lower end of the conveyor retracts. This action arises due to the force of top tier drive sprocket 6 upon the chain which is anchored by the motionless bottom tier drive sprocket 7. Retraction of the tensioning piston at the lower end of the conveyor permits chain to be fed to top tier driving sprocket 6. As slack develops at the upper end of the conveyor, it is taken up by the extending of the tensioning piston in this position. Positive pressure is provided to each tensioning cylinder sufficient to extend the carriage assembly when such slack develops. However, the pressure must be sufficiently low to yield under the impetus of a single drive sprocket without rupture of the continuous chain. Periods of interrupted motion of a single tier must be relatively short. The rapid load ejecting action of the hopper permits operation of the lower tier during most of the period during which the shipping container is handled.

It will be apparent that the top tier of the carrying tray must be halted intermittently for a period sufficient to permit the assembled article to be placed upon it. Since during these intermittent intervals, the bottom tier usually continues to be driven by its drive sprocket 7, lateral displacement of the continuous chain at each end of the conveyor due to compensation occurs in the direction toward the lower end of the conveyor. The carrying tray in the vicinity of loading operations is thereby maintained motionless. Automatic cut-off mechanisms must be provided at the extended stroke of the sliding carriage at each end of the conveyor to prevent two-blocking or jamming of the tensioning pistons within their respective cylinders. A cut-off mechanism for the drive sprocket of the top tier is provided at the upper end of the conveyor. Thus if trouble develops in the dumping mechanism and the pivoted bottom 75 of hopper 74 fails to return to battery in the expected period, the drive mechanism for the upper tier will be cut off and the conveying belt will halt before the compensating pistons 9 in their cylinders 10 reach the limits of their strokes. Likewise a cut-off switch for the drive sprocket of the bottom tier 7 is provided at the lower end of the conveyor. The purpose here also is to prevent the drive sprocket for the bottom tier 7 from attempting to extend and/or retract the tensioning pistons 9 in their cylinders 10 beyond the limits of their stroke. If either of these safety switches operates, the affected drive is shut down until the unaffected drive starts up and pulls the extended carriage off of the cut-off switch.

It will be obvious from a consideration of the above that the periods of stoppage for the top tier and the bottom tier over each repetitive cycle of operation must average out. In other words, compensating lateral motion toward the upper end of the conveyor must be equal to the lateral compensation toward the lower end of the conveyor in each repetitive cycle, or the mechanism will slowly walk toward one side or the other, producing inefficient operation. This is a matter of timing and operating technique which will vary with the equipment and the nature of the conveyed article. It is a matter well within the ability of a competent technician to adjust. The necessary length of carriage stroke to provide the required compensation will be governed by the spacing and extent of the periods of no motion in each of the top and bottom tiers. Obviously if a long loading time or a long dumping time is required, the compensating idler sprockets must be moved laterally a relatively long distance.

Consider now the operation of the conveyor as used in conjunction with a dynamite assembling machine as described in United States Patent No. 1,031,644 to H. P. Hall to deliver the sticks of dynamite to a box-handling mechanism. The dynamite is ejected in multiple units in parallel array by the dynamite assembling machine onto the motionless top tier of the compensating conveyor. As soon as the batch has been ejected and the ejection mechanism is clear of the conveying mechanism a timer linked to the operational cycle of the dynamite assembly machine starts the motor for the top tier drive sprocket 6. Motion of the top tier continues toward the upper end of the conveyor until a sufficient section of the carrying tray is available for further loading by the dynamite assembly machine. At this point, the timer cuts off the motion of the top tier by stopping the motor of drive sprocket 6. The carrying tray is now ready to receive the next batch of cartridges. This is representative of the motion of the top tier. It is an intermittent stop and go action, just sufficient to provide clearance at the carrying tray of the previously ejected batch of manufactured cartridges. Stop periods are for a sufficient length of time to permit loading by the ejection mechanism of the dynamite assembly machine.

The motion of the bottom tier is timed to the unloading cyle of the collecting hopper. The motor providing power for drive sprocket 7 for the lower tier will continue to run as long as the collecting hopper is being filled. While the collecting hopper is being emptied the motion of the bottom tier is halted. The motion of the bottom tier then is also intermittent. The bottom tier must be stopped each time the collecting hopper is emptied. The collecting hopper can be adjusted so as to dump its load at a given weight or at a given stick count. The motion of the two tiers within the limit of compensation provided by the idler sprockets can be readily correlated by adjustment of the relative speeds of the motors driving the upper and lower tiers respectively.

While the conveyor has been described as generally useful in the conveyance of any type of manufactured article which is manufactured in multiple units, it is especially suitable for the conveyance of sticks of dynamite from a cartridge filling machine such as previously described. This is true since the continuous tray and all exposed moving surfaces are free of any metal-to-metal contact which could create a hazard due to spillage of explosive powder due to rupture or improper manufacture of a dynamite stick.

Many obvious modifications will be apparent to those skilled in the art from a reading of the disclosure above without a departure from the inventive concept.

What is claimed is:

1. In a conveyor adapted to the handling of shock-sensitive articles, a continuous moving tray comprising a multiplicity of adjacently disposed partitioned plates arranged in endless fashion laterally extended from and supported by a housed endless driving means, the said endless driving means having two independent centrally located motivating means for its top and bottom tiers respectively, the support at each end of the said endless driving means possessing freedom of motion along the paths of travel of the said endless driving means, each said support being tensioned to provide and remove slack which develops by virtue of differences in average velocity of the said bottom and top tiers over a given interval.

2. The structure of claim 1 wherein the said housed endless driving means and the said adjacently disposed partitioned plates are shielded from each other by a non-sparking partition attached to the said plates and deflectionally keyed to the housing of the said driving means.

References Cited in the file of this patent

UNITED STATES PATENTS 2,551,080     Allen et al. _____________ May 1, 1951